United States Patent

Reick et al.

[15] 3,641,332
[45] Feb. 8, 1972

[54] FIBER OPTICS ILLUMINATION SYSTEM

[72] Inventors: Franklin G. Reick, 228 West Pl., Westwood, N.J. 07675; Joseph R. Wilder, 151 West 86th St., New York, N.Y. 10024

[73] Assignees: Michael Ebert; Frederick R. Picut; Franklin G. Reick; Joseph R. Wilder, , part interest to each

[22] Filed: Oct. 30, 1969

[21] Appl. No.: 872,519

[52] U.S. Cl.....................240/1 EI, 350/96 R, 264/1, 240/47
[51] Int. Cl. .........................F21v 29/00, G02b 5/14
[58] Field of Search..................240/1 EI; 350/96 R, 96 B; 264/1

[56] References Cited

UNITED STATES PATENTS

| | | | |
|---|---|---|---|
| 1,542,183 | 6/1925 | Steinberg | 350/96 |
| 1,663,308 | 3/1928 | Jenkins | 350/96 |
| 1,790,086 | 1/1931 | Boerstler | 240/47 |
| 1,800,277 | 4/1931 | Boerstler | 350/96 X |
| 1,940,671 | 12/1933 | Anderson | 350/96 X |
| 2,227,422 | 1/1941 | Boerstler | 128/397 |
| 2,825,260 | 3/1958 | O'Brien | 88/1 |
| 3,010,357 | 11/1961 | Hirschowitz | 88/1 |
| 3,030,852 | 4/1962 | Courtney Pratt | 350/96 |
| 3,253,896 | 5/1966 | Woodcock et al. | 65/3 |
| 3,285,242 | 11/1966 | Wallace | 128/23 |
| 3,370,502 | 2/1968 | Wilks | 88/14 |
| 3,433,570 | 3/1969 | Hansen | 356/128 |
| 3,434,776 | 3/1969 | Kern | 350/96 |
| 3,472,921 | 10/1969 | Fyfe | 264/1 |
| 3,497,577 | 2/1970 | Wichterle | 264/1 |
| 3,518,341 | 6/1970 | Haryu | 264/255 |

FOREIGN PATENTS OR APPLICATIONS 1,245,162   7/1967   Germany..............350/96 B

*Primary Examiner*—Richard C. Queisser
*Assistant Examiner*—John Whalen
*Attorney*—Michael Ebert

[57] ABSTRACT

A fiber optics illumination system provided with a light source whose output is distributed among a plurality of flexible light pipes, the light transmitted by the pipes being applied to light tips or other instruments. The source includes a tungsten-halogen lamp submerged in water to effect filtration of infrared radiation, whereby cold light is supplied to the pipes, each pipe being constituted by a core of resinous material of large diameter contained within a cladding tube and separated therefrom by an air or other film having a relatively low-refractive index compared to that of the core.

13 Claims, 8 Drawing Figures

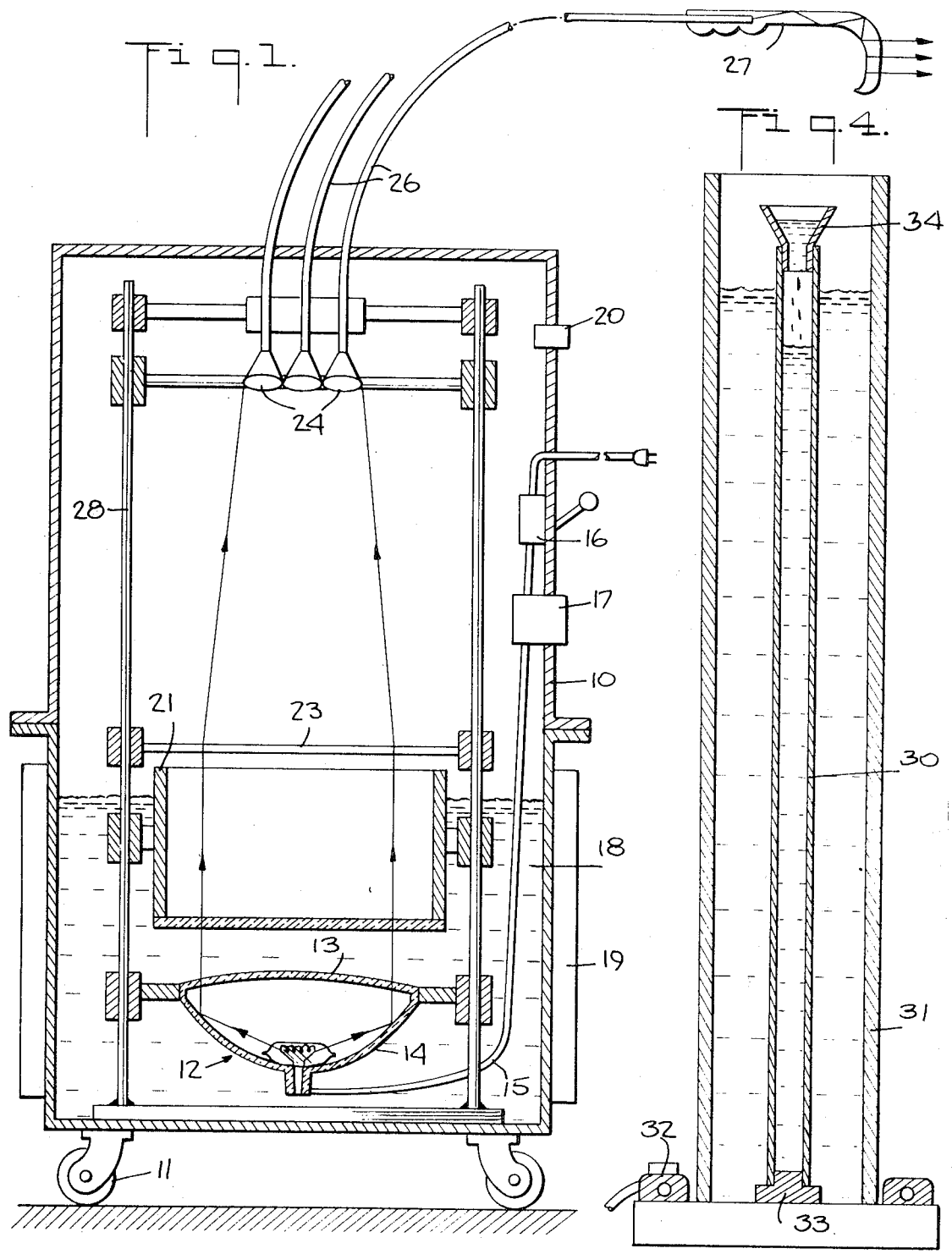

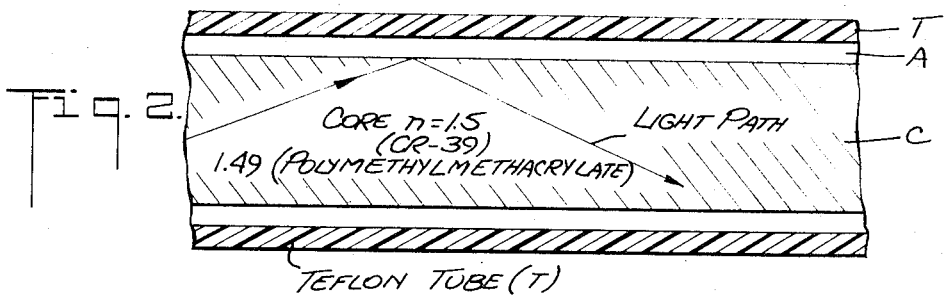
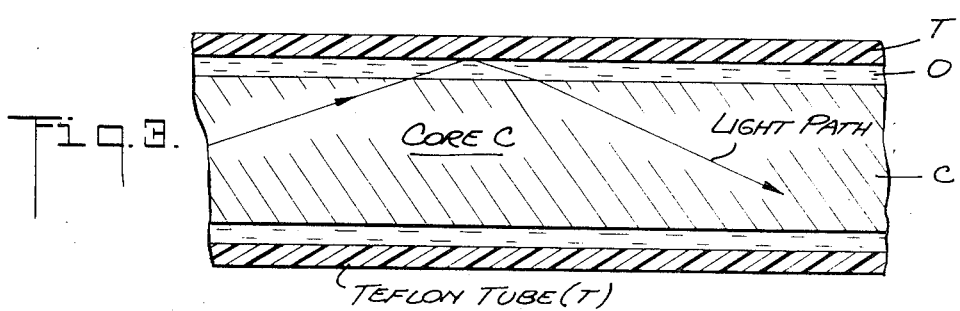
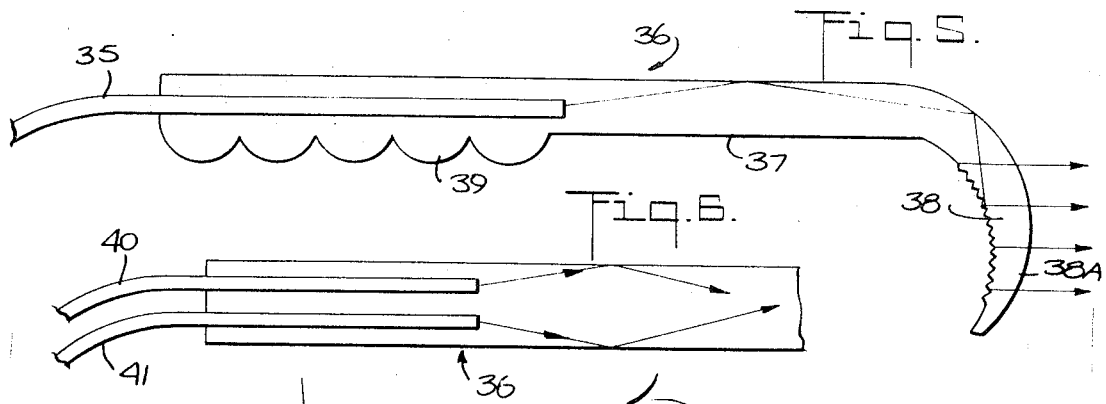
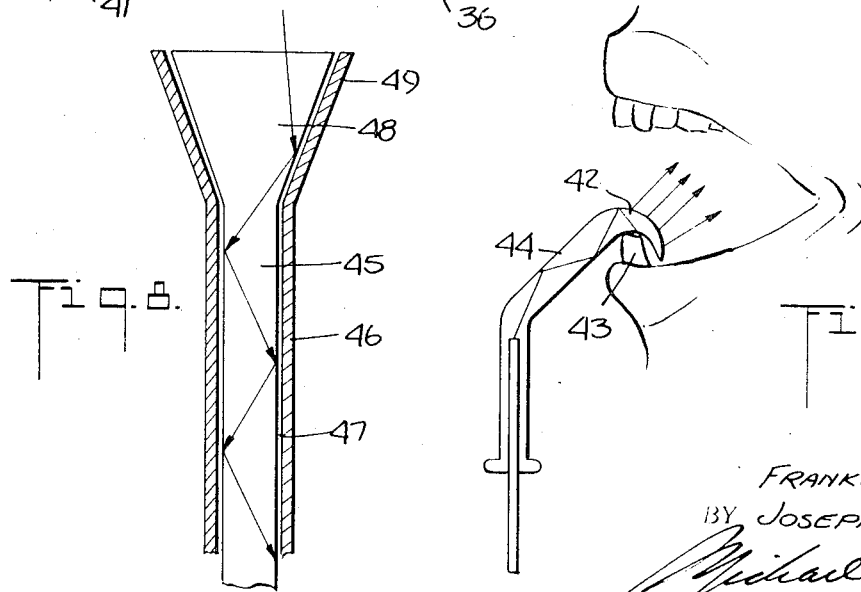

FIBER OPTICS ILLUMINATION SYSTEM

BACKGROUND OF INVENTION

This invention relates generally to light guide illuminators, and more particularly to a fiber optics illuminating system for medical, surgical and dental applications.

Though the invention will be described mainly in the context of medical, surgical and dental applications, it is to be understood that the invention is not limited thereto, for a system in accordance with the invention is capable of transmitting "cold light" of high intensity, by means of flexible routing, to remote or inaccessible locations and to hazardous areas, or to any abnormal environment which is difficult to illuminate by conventional techniques. The invention is useful in a broad spectrum of industrial applications to carry out such functions as sensing, signalling, and controlling, as well as general illumination.

The professional concern of doctors, surgeons and dentists is with body cavities and surgical sites which, unless clearly visible, cannot be properly diagnosed or treated. Existing techniques for illuminating such regions are often inadequate and unsafe, for they either do not succeed in supplying sufficient illumination or they generate excessive amounts of heat which may injure human tissue as well as cause discomfort to the observer. In some instances, commercially available illuminators interfere with medical procedures and also constitute a hazard to both patient and doctor.

The standard operating room illuminator is constituted by batteries of explosion-proof spot lamps and floor lamps, which are capable of being shifted or aimed to suit particular procedures. Such illuminators, which are quite costly, are not only cumbersome, but they fail to afford adequate illumination for deep cavities, in that the light sources are above or behind the surgeons or other operating personnel, whose heads, hands and instruments, as they shift position, often block the light rays. Moreover, heat generated by conventional high-intensity lamps is so great that special cooling devices are required, but such devices, which draw away heated air, are not effective with respect to infrared radiation.

In recent years, attempts have been made to use long, flexible fiber optics light guides in medical and related applications. Such guides are advantageous in that they furnish "cold light" and segregate the heavy and bulky assembly of lamp, condenser and cooling system from the point of observation. Also, with the development of flexible fiber optic guides with fused ends and plastic casings, sterilization of the instrument is possible.

Thus fiber optic guides may be used as auxiliary illuminators for close diagnostic and surgical operations, as illuminators for direct or indirect opthalomoscopes, and as specially shaped illumination accessories to classical-designed cystoscopes, proctoscopes, retractors, and various forms of medical, surgical and dental tools.

Despite the obvious advantages of fiber optics for cold-light illumination, their use in the surgical, medical and dental fields has been relatively limited. The reason for this does not lie in any inherent theoretical deficiency, but in the fact that with existing technology, the three basic components of the fiber optics system, when brought together, do not afford sufficient illumination in those situations calling for large amounts of cold light which can be readily directed to selected areas of a body cavity.

Existing light sources for fiber optic illuminators make use of high-intensity lamps operating in conjunction with infrared filters. Such filters, while absorbing infrared energy, also to some degree filter out rays in other regions and thereby attenuate the useful light. Moreover, commercial light sources entail relatively elaborate and costly optical systems adapted to admit light into the ends of the fiber optic guides.

But even with a high-power light source whose light output is exceptionally intense, the transmission losses of existing light pipes are so great that with pipes of long length, the output of light available at the output ends falls below illumination requirements. While shorter fiber optic pipes give a much greater output, in many medical procedures it is not feasible to bring the light source close to the observation zone, hence longer guides are necessary, and these yield insufficient light.

The practical deficiencies of known light sources and fiber optic pipes, when combined with the inefficient utilization of available light which is characteristic of many instruments adapted to operate in conjunction with such pipes, are such that while the idea of a cold-light system remains attractive, the practical realization thereof falls far short of the illumination requirements in the medical and dental fields.

SUMMARY OF INVENTION

In view of the foregoing, it is the main object of this invention to provide an improved fiber optics illumination system which is mechanically and optically efficient and which may be produced at relatively low cost.

More specifically, it is an object of the invention to provide an illumination system including a compact light source adapted to generate cold light of high intensity, the light output thereof being distributed among a plurality of fiber optics light pipes which terminate in disposable light tips or working instruments.

Among the significant features of a light source in accordance with the invention are the use of a tungsten-halogen lamp of high intensity in combination with a water filter to absorb infra-red radiation from the lamp, whereby the light applied to the input end of the pipes is relatively free of heat rays.

Also an object of the invention is to provide a flexible light pipe formed of a resinous core ensheathed in a plastic cladding tube, the pipe having exceptionally low transmission losses as compared to existing clad pipes. An important aspect of the invention resides in a technique for forming such light pipes with an air film interposed between the core and the cladding tube, thereby enhancing the difference in refractive index between the core and its surrounding medium to improve the light-gathering ability of the pipe.

A major feature of a light pipe in accordance with the invention is that the core, which is of large cross-sectional area, is a monofilament and, therefore, is not the usual bundle of low-denier fibers. Thus optical crosstalk and other disadvantages of bundled fibers are obviated. But this factor is not important in the context of light transmission, as distinguished from image transmission. However, a core made up of a bundle of clad fibers has an effective cross-sectional area in which the clad material and the interstices of the clad fibers constitute dead space, whereas in a monofilament core according to the invention, the entire cross-sectional area is light-conductive.

A further object of the invention is to provide light tips and working instruments, which are attachable to light pipes whereby the tips and instruments are irradiated with cold light of high intensity and may be used to effectively illuminate deep cavities and out-of-the-way sites which are otherwise difficult to observe.

Briefly stated, these and other objects of the invention are accomplished in an illumination system comprising a light source and a plurality of flexible fiber optic pipes coupled to the source for transmitting light to tips and instruments, the source including a tungsten-halogen lamp submerged in water, the filtered rays of the lamp being optically directed onto the input ends of the pipes, which are constituted by a resinous monofilament core having a relatively high refractive index surrounded by a Teflon or other cladding tube and spaced therefrom by an air film having a low refractive index, the pipes being capable of conducting light around relatively sharp bends without significant transmission losses.

BRIEF DESCRIPTION OF DRAWING

For a better understanding of the invention, as well as other objects and further features thereof, reference is made to the following detailed description to be read in conjunction with the accompanying drawing, wherein:

FIG. 1 schematically shows a light source in accordance with the invention;

FIG. 2 is a section taken through one embodiment of a light pipe in accordance with the invention;

FIG. 3 is a section taken through another embodiment of a light pipe according to the invention;

FIG. 4 is a section taken through a core-curing assembly;

FIG. 5 is a sectional view of a light tip in accordance with the invention;

FIG. 6 illustrates a modified form of handle for a light tip;

FIG. 7 shows a dental illuminator, and

FIG. 8 shows a preferred form of input for the light pipe.

DESCRIPTION OF INVENTION

Light Source

The basic components of a fiber optics illumination system are a light source, light pipes for routing light from the source, and instruments making use of the light transmitted by the pipes. We shall first consider the light source.

In a system intended for medical purposes, it is not sufficient that the source give off intense light, for the source must also possess an extremely long operating life between lamp failures. Moreover, the source must be explosion-proof and easily maintained.

Referring now to FIG. 1, there is shown a preferred form of light source according to the invention. The source is housed in an easily opened canister 10, mounted on casters 11 so that the source may be quickly moved to a new site, when necessary. Disposed within the canister adjacent the base thereof is a long-life tungsten-halogen lamp 12. The lamp is mounted within a sealed glass envelope 13 having a parabolic reflector 14, producing a beam of parallel rays. The lamp is preferably of the type manufactured by Sylvania Electric Products, Inc. (Tungsten Halogen PAR-56 Q Lamp).

Ordinary incandescent lamps darken in time due to evaporation of tungsten particles from the filament onto the relatively cool bulb surface. The introduction of a halogen into the lamp atmosphere causes interception of the tungsten particles which combine with the halogen gas. The tungsten particles are then redeposited back on the filament and the halogen gas is released to repeat the cycle. This results in clean bulb walls and more efficient transmission of light over the life of the lamp. Lamps of this type have an average rated lamp life of 4,000 hours, which is far greater than that of ordinary incandescent lamps.

Electrical connections to the lamp are made by way of a cable 15 ensheathed in silicone rubber for high-temperature waterproofing. Interposed in the powerline is an explosion-proof on-off switch 16 and an integrating meter 17, which serves to indicate the accumulated time of lamp operation, thereby making it possible to replace the lamp without waiting for the expiration of its rated life. In this way, by anticipating lamp failure, the loss of light in the course of an operating procedure can be prevented.

While a tungsten-halogen lamp is an intense source of white light, a substantial portion of the radiant energy emitted by the tungsten filament lies in the infrared region. To provide "cold light," it is essential that infrared energy be filtered out of the source. To accomplish this result, the lamp is submerged in a bath 18 of distilled water of high quality which acts to absorb infrared energy, but is otherwise permeable to the lamp radiation.

As is well known, water is essentially opaque to infrared radiation longer than 3 microns. Few liquids have absorption coefficients of the same order of magnitude. By conducting the light through water, heat is absorbed thereby, the heat being dissipated into the atmosphere by an array of radiating fins 19 projecting from the lower portion of the canister.

The use of high-quality distilled water acts to minimize light scattering by foreign particles and gas bubbles otherwise dispersed or suspended in the water. To prevent the growth of micro-organisms, a bactericide may be added to the water. A preferred material for this purpose is Hyamine 3500 (Rohm E. Haas Co.), which is a blend of allyl dimethyl benzyl ammonium chloride which has exceptional microbicidal effectiveness in hard water. The water may be irradiated by an ultraviolet lamp to attain the same purpose. While it is highly unlikely that the water will boil, a blowoff valve 20 is provided on the canister in this event.

The free surface of water tends to be ripply and of poor optical quality. In order to provide a smooth optical surface, a cylinder 21 is partially immersed in the water, the inner end of the cylinder being enclosed by a transparent plate 22 of glass or acrylic material, to define an air-filled well so that at the interface, the water, which is below the surface level, is even, and optical distortion is obviated. The water surrounding the well is, therefore, free to expand or contract due to heating and cooling, and to slosh due to vibration or shock, but the optical output surface is always smooth. The filtering efficiency is determined by the distance the rays travel through the water path, but even a thin water layer absorbs a substantial amount of infrared energy.

Parallel rays produced by the parabolic lamp reflector are directed through the well onto a Fresnel lens 23 which focuses the rays onto an array of individual convex input lenses 24 mounted below a holder 25, each input lens being coupled to the input end of a light pipe 26. Each pipe in turn is coupled to a suitable instrument 27. The nature of these pipes and instruments will be discussed in subsequent sections.

The entire optical system disposed within canister 10 is mounted on a frame including a cage of rods 28, so that the system can readily be removed from the canister for servicing. The optical elements of the system are preferably coated with a suitable anti-fog compound to prevent water droplets from forming thereon.

Thus the intense light from the bulb is first filtered by water to remove undesirable heat-producing components, and is then concentrated in the array of individual lamps which act as a light distributor or manifold. While the optical system has been shown as mounted vertically in the canister, so that the light pipes must thereafter bend from the vertical, one may arrange the system in a horizontal mounting, in which event the canister is partitioned by a glass wall to provide a water compartment to contain the lamp, and an air compartment for the optical elements.

Light Pipe

In an illumination system, the most important component is the light pipe, for unless this component has a fair degree of flexibility and functions efficiently to transmit a large amount of light, then a high-intensity light source and an effective light tip or other working instrument will be of little avail. Moreover, unless the light pipe can be produced economically, its cost may make the price of the system prohibitive for many applications.

Before considering the structure of a light pipe in accordance with the invention, it is best to review briefly certain underlying principles involved in the transmission of light by optical fibers, for these principles come into play in the operation of the present invention.

A long, polished cylinder of glass is capable of transmitting light from one end to the other without leakage, provided the light strikes the wall of the cylinder with an angle of incidence greater than the critical angle for total internal reflection. In transmission, light travels along the cylinder in a zig path of successive reflections. For the light to be transmitted without reflection loss, it is necessary that the angle $l$ exceed the critical angle:

$$\sin l = N_2/N_1$$

where $N_1$ is the refractive index of the cylinder, and $N_2$, the refractive index of the medium surrounding this cylinder. From this one can determine that the maximum external slop of a ray which is to be totally reflected, is:

$$\sin U = x_0 \; l \; \sqrt{N_1^2 - N_2^2}$$

where $U$ is the angle of incidence of the incoming ray at the input end of the cylinder, and $N_0$ is the refractive index of the medium at the input end. This acceptance cone of a cylinder is often specified as the numerical aperture.

If the light-transmitting cylinder is bent into a moderate curve, a certain amount of light will leak out of the sides of the cylinder. However, the major portion of the light is still trapped inside the cylinder. It is for this reason that curved rods or fibers made of thin filaments of glass or plastic may be used to conduct light from one location to another in curved paths.

Thus a transparent glass or plastic rod suspended in air has the capability of transmitting light. However, a device of this type is deficient for the following reasons. The presence of dust particles or other surface contamination scatters a certain fraction of the light incident on the interface. Although this loss is very small per reflection, in an optical fiber the ray must undergo numerous reflections and this cumulative loss becomes extremely large. Moreover, when multielement constructions are utilized in which the fibers are gathered together in a tight bundle, a small amount of light leakage will occur from fiber to fiber. This phenomenon, usually referred to as "optical crosstalk," cannot be tolerated for certain applications. Finally, where the unprotected rod makes contact with a medium of higher refractive index, light loss will occur.

For these reasons, it is usually necessary that the fibers be optically insulated from one another with a cladding or sheath of refractive index lower than the core. Since light traveling down a fiber actually penetrates the sheath a few wavelengths, it necessarily must be transparent. The light-gathering ability of a fiber is solely dependent on the relative refractive indices of the core and sheath materials.

The amount of light transmitted by a light guide is dependent on a combination of the following factors:
a. light intensity at the input end;
b. light loss at the input air-fiber interface;
c. cross-sectional area of light-transmitting fibers;
d. light loss along the length of the light guide; and
e. light loss at the output air-fiber interface.

In a light guide, light energy is lost by absorption and scattering, which is an exponential process. However, by the use of high-intensity light sources, it is possible to transmit light over relatively long lengths, if the cross-sectional area of the conductor is large. However, it has not, heretofore, been possible to produce flexible light pipes of large cross section except by bundling fibers of smaller diameter.

From the foregoing, it is evident that the best light pipes have a core of the highest possible refractive index and a cladding of the lowest possible refractive index, the cladding functioning to protect the surface from scratches, dust, grease, all of which give rise to losses. A typical form of commercially available light guide is the "CROFON" guide manufactured by DuPont, and consisting of fibers formed of a core of polymethyl methacrylate sheathed with a transparent polymer of lower refractive index, the jacket being made of polyethylene.

Polyethylene has a refractive index of 1.54 as compared to air, whose index is 1.0. However, while air has the lowest possible refractive index and is theoretically superior to polyethylene as a cladding material, or for that matter to all other flexible plastics suitable as cladding, air has not heretofore been acceptable in that it fails to protect the core surface from contaminants.

One significant feature of the present invention, as illustrated in FIG. 2, is that the light pipe is constituted by a flexible core C enclosed in a flexible cladding tube T but separated therefrom by a film of air A, so that the protective properties of a cladding tube are combined with the optical effects of air. Reflections occur at this instance serving to strengthen the tube and to protect the core. There is no reflection from the inner surface of the clad in those areas where the clad is separated from the core by an airspace.

Before giving examples of how a light pipe in accordance with the invention is fabricated and the materials used therein, we shall set out in the table below, the refractive indices of certain materials of interest:

| Material | Refractive Index |
|---|---|
| Air | 1 |
| Water | 1.333 |
| Teflon TFE (microcrystaline—scatters light) | 1.35 |
| Teflon FEP (amorphous—clear—doesn't scatter as badly as TFE) | 1.34 |
| CR-39 Allyl diglycol carbonate | 1.5 |
| Lucite (Polymethylmethacrylate) | 1.49 |
| RTV Silicone 615A | 1.43 |
| Polyethylene | 1.54 |
| Polystyrene | 1.59 (Birefringent) |
| Fluorolubes (Hooker Chemical Co.) | 1.365–1.396 |
| Epoxy | 1.6 |
| Cellulose Propionate | 1.46–1.49 |
| CTFE (Chlorotrifluoroethane) | 1.429–1.435 |
| L-45 Silicone oil (Union Carbide) | 1.403 |
| XFI-0183 (Dow Corning) | −1.4525 |
| Arochlors | 1.617–1.665 |

EXAMPLE 1

One method of making a light pipe of the type including an air film between the core and cladding tube is to fill an elongated tube of Teflon with a core of clear catalyzed resin, which may be methyl methacrylate or allyl diglycol carbonate (CR-39), the core having a cross-sectional area slightly smaller than that of the tube interior to define an annular air space therebetween.

The polymer, polytetrafluoroethylene, sold under the trademark "Teflon," is noted for its unsurpassed chemical, electrical and heat-resistance properties, as well as for its unusual antiadhesive and surface frictional characteristics. Teflon (TFE), which is microcrystalline in form and scatters light to some degree, has a refractive index of 1.35, whereas Teflon (FEP) is amorphous and clear, and less given to light-scattering. Teflon (FEP) is, therefore, preferred. It is to be understood, however, that the invention is not limited to Teflon cladding, and other forms, such as polyethylene, may be used.

In practice, Teflon, which is commercially available in tubular form, may be uniaxially oriented by stretching to reduce its diameter, and also its wall thickness, thereby increasing the length of the tube. This makes it possible to produce thin-walled light-pipe sheaths of Teflon extrusions, to effect significant manufacturing economies. One may start, therefore, with tubing which is oversize for its intended purpose, and then stretch it to the desired diameter.

In making the pipe, the selected monomer of core resin in flowable form is first vacuum-filtered and degassed. It is then sucked into the Teflon tube, which is bent into a U-formation to prevent leakage of the resin. The filled tube is then subjected to heat at an appropriate temperature level and for a period of time sufficient to cure the resin therein. In the course of polymerization, the resin core within the tube shrinks and separates from the tube to create an annular air film between the tube and core.

A resin (CR-39) which is undercatalyzed, remains flexible. Hence by using an undercatalyzed resin as the core material, flexibility of an otherwise rigid core material is obtained, and while this core lacks strength, this is not a problem, for the resin is protectively sheathed by the relatively strong Teflon tube.

A light-transmitting pipe of the above-described type has superior light-gathering power because the difference in refractive indices of the core and air sheath are markedly greater than those in existing pipes. The index of polymethylmethacrylate (Lucite) is 1.49 as compared to air, which is 1.0.

An even greater difference is had with CR-39, whose refractive index is 1.5.

In those places where the core material touches the Teflon outer tube, some light losses occur, but these losses are not substantial, since Teflon has a refractive index of 1.34 or 1.35, depending on its type, this value being lower than the core index. Thus, for the most part, internal reflection in the pipe occurs at the interface of the core and air film, except where the core makes contact with the tube and is reflected thereby.

EXAMPLE 2

Instead of using an air layer between the core and cladding tube, one may make use of a thin layer of silicone oil having an intermediate refractive index, as shown in FIG. 3. This is made by drawing oil into the tube, after which it is drained. The oil-coated tube is then filled with resin, so that a thin plug of silicone oil is formed at the top of the resin core. When the resin is thereafter heated and cured, in the course of resin shrinkage the oil is sucked between the core and tube to fill the void therebetween.

The technique works best with high-density monomers (CR-39-=1.32). Otherwise, with a low-density monomer, the monomer will tend to float on the oil. Methyl Methacrylate must be advanced to the syrupy state before casting, for this monomer is a good solvent for silicone oil. Silicone oil, which is soluble in the monomer, is not, however, soluble in the polymer.

As shown in FIG. 3, light reflected in the core is directed toward the oil film O, where it is slightly bent and reflected at the interface of the oil film and outer tube, the ray being returned to the core. The advantage of this arrangement is that the oil surface affords a smooth, mirrorlike surface to cast the resin against, and provide a light pipe which is highly efficient.

EXAMPLE 3

The methacrylate esters (*Monomeric Acrylic Esters* E. H. Riddle, Reinhold Publishing Corp., 1954) provide a family of crystal-clear, transparent monomers which can be polymerized by themselves or in mixtures to give polymers ranging from soft, rubberlike materials to hard plastics. The hardest of these polymers is methyl methacrylate. Toward the other end of the hardness range is butyl methacrylate, which is permanently soft.

Uninhibited methacrylate monomers polymerize readily under the influence of heat, light and peroxide catalysts. However, the peroxide catalyst tends to cause the polymer to assume a yellowish color. Hence in making the core, it is preferred to use a catalyst which is a source of free radicals and used in low concentrations, i.e., 0.01 percent (2,2'-Azobis [2-methyl-propionitrile]).

In a preferred technique, use is made of a water-white plasticizer of high refractive index and density. For this purpose, the methyl methacrylate monomer is combined with Arochlors whose refractive index is 1.617–1.665.

The Arochlors, which are made by Monsanto Chemical Company, are chlorinated biphenyl and chlorinated polyphenyls which are nonoxidizing, permanently thermoplastic, of low volatility, and noncorrosive to metals. By combining the methyl methacrylate with Arochlor (1242) in a range of 30 to 50 percent of Arochlor by weight, the resultant composite resin, when cured, is leathery but free of surface tackiness in a Teflon tube, and is very flexible but with no tendency to crack. The composite resin has a refractive index that is the sum of its constituents, and this index is low relative to that of the tube. The various types of Arochlor and their properties are described in the booklet "Arochlors" Application data bulletin NO O-P-115, published by Monsanto Chemical Company.

CURING TECHNIQUES

In casting optical resins in Teflon tubes, in accordance with the invention, the following resins are preferred, the properties thereof being listed in the table below:

| Resin | n | Shrinkage on Cure | Density of Monomer | Boiling Point of Monomer |
| --- | --- | --- | --- | --- |
| Methyl Methacrylate | 1.489P 1.4119M | 21% | 0.939 | 100° C. |
| Ethyl Methacrylate | 1.484P 1.4116M | 18% | 0.909 | 117° C. |
| Butyl Methacrylate | 1.4220M 1.483P | 15% | 0.889 | 163° C. |
| Allyl Methacrylate | 1.435 | 21% | 0.93 | 150° C. |
| Cyclohexyl Methacrylate | 1.506 | 12% | 0.96 | 210° C. |
| Ethylene Glycol Dimethacrylate | 1.45 | 15% | 1.048 | 260° C. |
| Allyl Diglycol Carbonate CR39 | 1.504 | 14% | 1.32 | 160° C. (2mm. Hg) |

The above resins can be polymerized in any and all combinations to attain the desired properties in the end product. When these resins are cast within Teflon tubes to make light-transmitting pipes, several problems arise:

A. The resins tend to be inhibited in their cure by atmospheric oxygen. $O_2$ is a negative catalyst and diffuses through Teflon to inhibit the surface cure.

B. The resins shrink where they have polymerized to the jell state and beyond. The more fluid, uncured material then flows along the walls and makes an imperfect surface that has poor light-transmitting properties.

To solve this problem, a curing technique is used employing the assembly shown in FIG. 4. The Teflon tube 30 is supported concentrically within a cylindrical container 31, the base of which has a heater and thermostat 32 mounted thereon. The annular space between the wall of the tube and container is filled with hot water which contains very little oxygen.

The Teflon tube is closed at the bottom with a stopper 33, and is filled with the resin to be cured through a funnel 34, the resin initially being at a level rising into the funnel. Because the heat is applied at the bottom of the tube, a temperature gradient of about 5° C. from the bottom to the top of the water bath forces the resin to cure and set progressively, beginning with the warmest region. The fluid resin above the curing zone moves freely as the jell forms, so that shrinkage in mass is less troublesome. This curing technique is therefore analogous to the crystal-growing process, and, for example, in the making of semiconductors.

In one embodiment of light-pipe cured by the gradient bath hot-water technique, the copolymer used in the core is a combination, by weight, of the following constituents:
50% Methyl Methacrylate
50% CR 39
0.01% Azo catalyst.

The core material was cured in a gradient bath to produce a stain-free jell that takes boiling water with no loss of properties. Because the gradient bath is very quiet, no turbulences exist to introduce striations in the final product. The absence of striations and stains in the core jell is optically advantageous.

The preferred catalysts are the following:
AZO
2.2''-Azobis (2 Methylpropionitrile) (Eastman Organic Chemicals—supplier)
Azobisisobutyronitrile (Vazo 64—Dupont,—supplier)
PEROXIDE
Acetyl Peroxide 25 percent in Dimethylphthalate
t-Butyl Peroclarate in Dioctyl Phthalate Bis (1-Hydroxycyclohexyl) Peroxide
Lauryl Peroxide
85 percent Cyclohexanone Peroxide and Plasticizer (Wallace & Tiernan—supplier)

The azo catalysts are used at about 0.01 percent PHR and introduce the least color.

The peroxide catalysts are needed for CR-39, since it cures very sluggishly. They tend to introduce some color, so they are used sparingly.

For certain ratios of tube diameter to thickness of the tube wall, the vacuum created by shrinkage of the core in the course of curing, causes the tube to suck in and decrease its volume. This imparts an elliptical cross section to the light pipe, which makes it easier to bend in the plane of thinnest cross section without impairing the light-transmitting properties of the pipe.

POST-CURING

After the polymer jell has been grown in the gradient bath by the curing techniques previously described, the assembly is post-cured at 200° to 250° F. in a circulating hot-air oven, for 8 hours. This imparts toughness or a leathery quality to the jell, so that it is then capable of taking very sharp bends and it becomes possible to make thick-section pipes that are easily manipulated and take abuse without damage.

LIGHT APPLICATORS

The light pipe transmitting cold light from the light source, such as pipe 35 in FIG. 5, may be coupled to a suitable light tip or applicator to light up a body cavity, or for any other purpose where it is difficult to illuminate an area by conventional means.

The light applicator 36, shown in FIG. 5, is fabricated from a rigid light-transmitting acrylic plastic, such as Lucite or Plexiglas, which conducts light by total internal reflection. Applicator 36 is provided with a linear section 37 which joins a wedge-shaped and curved section 38. The undersurface of the linear section is corrugated to form a handle 39.

To pipe a majority of internal light within a curved piece, the minimum inside radius must be at least twice the thickness of the part, otherwise many rays will be lost through the outer surface because they strike it at an angle at which reflection does not occur.

Any ray of light within acrylic plastic which encounters an air interface at the critical angle (42.2° off normal) or greater, will not be transmitted, but will be totally reflected back into the material at an equal and opposite angle. But in the wedge formation of the curved section 38, light enters the section at the thickest portion thereof and is transmitted therethrough by multiple reflection toward the thin edge thereof. At each reflection, the angle of incidence in the wedge becomes progressively closer to normal until it is less than 42.2° at which point the light pierces the air interface to escape from the applicator at both faces of the wedge.

In the arrangement shown, the taper of the curved section 38 is made such as to cause light decollimation and emission from the front face 38A, whereas the rear face 38B is roughened and painted white. The white paint acts to scatter the light back through the conduit as a random flux, this effect being enhanced by roughening the surface, which serves to destroy the polish of the reflecting surface to cause the light rays to scatter as they strike the roughened zone. Thus a relatively uniform illuminating flux emanates from the exposed side of the front face of the conduit to light up the cavity in which the applicator is inserted.

The light pipe is attached to applicator 36 through a longitudinal bore therein, so that light at the output end of the pipe is transferred to the applicator. In order to increase the light input, one may provide a double-barrelled input, as shown in FIG. 6, where two light pipes 40 and 41 are inserted in the applicator.

Because the applicator is made of inexpensive plastic, it is disposable after use. Alternatively, the applicator may be sterilized after use. The configuration of the light applicator is made such as to meet particular medical or dental requirements. Thus, as shown in FIG. 7, the light applicator 44 is provided with a relatively sharp bend 42 to form a hook permitting a dentist to rest the tip on the lower teeth 43 of a patient, and thereby illuminate the mouth cavity.

It is important that the light pipe terminate in the applicator at a point beyond the hand grip or other discontinuities that might give rise to scattering or other light losses due to frustrated internal reflection. Thus, in FIG. 5, the pipe terminates at a point beyond the hand grip.

In some instances, it is not necessary or desirable to use tips or applicators, but to spray light into a cavity from the output end of the pipe. In this event, it may be desirable to be able to shape or bend the pipe into a useful form. This may be accomplished by surrounding the end of the pipe with a helical "gooseneck" capable of being bent into any desired form and to maintain the curvature thereof. Or one may weld or otherwise adhere a piece of bendable wire along the light pipe. This wire could be in the form of a bendable polyethylene or polyvinyl filament which holds its form after bending. One may extrude a sleeve of polyethylene which is adapted to slip over the end of the light pipe, the sleeve being provided with an auxiliary barrel integral therewith to accommodate the wire.

In FIG. 8, there is shown a preferred form of input end for the light pipe having improved light gathering power. The input end of the pipe, which is constituted by a core 45 and a cladding tube 46 with an airspace 47 therebetween, is formed with a tapered inlet having a frustoconical core section 48 and a matching tube section 49. This acts to reduce the alignment problems in the input optics, but it also reduces the acceptance angle of the input beam so that it works best with small input angles.

The problem of illumination is particularly severe in the case of dentists, for while high-intensity illuminators are available to dentists, which illuminators are adjustable, the hands and head of the dentist are often interposed in the light path, making it difficult to carry out oral observation. To adapt the light pipe, in accordance with the invention, to dental use, the terminal section of the pipe may be made replaceable, the section being attached by means of a universal joint to an aspirator employed by dentists to draw saliva from the oral cavity. The dentist, by adjusting the position of the terminal section on the aspirator, is able to direct light to any desired area of the mouth. One may also supply dentists with loop-shaped light-pipe terminal sections adapted to rest within the mouth to provide an annulus of light for general illumination purposes within the oral cavity.

While there have been shown and described preferred embodiments of fiber optics illumination systems in accordance with the invention, it will be appreciated that many changes and modifications may be made therein without, however, departing from the essential spirit of the invention.

What we claim is:

1. A fiber optics illumination system comprising:
   A. a source of intense light,
   B. an applicator to apply light derived from said source to an area requiring illumination, and
   C. a bendable light pipe coupling said source to said applicator to transmit light thereto, said pipe being constituted by a monofilamentary core of flexible resinous material capable of transmitting light by internal reflection and having a relatively high refractive index, and a tube of flexible material surrounding said core, the cross-sectional area of said core being slightly smaller than that of the tube interior to define an annular air film therebetween, said tube being of a material whose refractive index is higher than air but lower than that of said core.

2. A system as set forth in claim 1, wherein said core is formed by methyl methacrylate.

3. A system as set forth in claim 1, wherein said core is formed by Butyl methacrylate.

4. A system as set forth in claim 1, wherein said core is formed by allyl diglycol carbonate.

5. A system as set forth in claim 1, wherein said core consists essentially of equal parts of methyl methacrylate, allyl diglycol carbonate and less than 1 percent by weight of Azo catalyst.

6. A system as set forth in claim 1, wherein said tube is formed by polytetrafluoroethylene.

7. A system as set forth in claim 6, wherein said tube is monoaxially stretch oriented.

8. A system as set forth in claim 1, wherein said tube is formed of polyethylene.

9. The method of forming a bendable light-transmitted pipe constituted by a monofilamentary flexible core of resinous material capable of transmitting light by internal reflection and having a relatively high refractive index, and a flexible tube of protective material surrounding said core, the cross-sectional area of said core being slightly smaller than that of the tube interior to define an annular air film therebetween, said method comprising the steps of:

A. filling said tube with said core material in monomer form, and

B. Curing said monomer to effect polymerization thereof and to cause the core in said tube to shrink to define said air film.

10. A method as set forth in claim 9, wherein said monomer is progressively cured.

11. A bendable light-transmitting pipe comprising:

A. a monofilamentary flexible core constituted by a resinous material capable of transmitting light by internal reflection and having a relatively high refractive index, and B. a flexible tube of protective material surrounding said core and having an interior cross section slightly larger than the cross-sectional area of the core to define an annular air film between the tube and the core, the tube being of a material having a refractive index which is higher than air but lower than that of the core.

12. A pipe as set forth in claim 11, wherein said pipe has an elliptical cross section.

13. A pipe as set forth in claim 11, wherein said core is formed by methyl methacrylate in combination with an Arochlor.

* * * * *